(12) United States Patent
Zhan et al.

(10) Patent No.: US 11,445,855 B2
(45) Date of Patent: Sep. 20, 2022

(54) AIR INLET DEVICE OF AIR FRYER

(71) Applicant: Tsann Kuen (Zhangzhou) Enterprise Co., Ltd., Fujian (CN)

(72) Inventors: Yixin Zhan, Zhangzhou (CN); Yongmou Zhang, Zhangzhou (CN); Yuxiang Lin, Zhangzhou (CN)

(73) Assignee: TSANN KUEN (ZHANGZHOU) ENTERPRISE CO., LTD., Zhangzhou (CN)

( * ) Notice: Subject to any disclaimer, the term of this patent is extended or adjusted under 35 U.S.C. 154(b) by 305 days.

(21) Appl. No.: 16/897,055

(22) Filed: Jun. 9, 2020

(65) Prior Publication Data

US 2021/0059470 A1 Mar. 4, 2021

(30) Foreign Application Priority Data

Sep. 3, 2019 (CN) .......................... 201910827877.0

(51) Int. Cl.
*A47J 37/06* (2006.01)
*A47J 37/12* (2006.01)
*B65D 51/16* (2006.01)

(52) U.S. Cl.
CPC ....... *A47J 37/0641* (2013.01); *A47J 37/1276* (2013.01); *B65D 51/1611* (2013.01); *A47J 37/1209* (2013.01)

(58) Field of Classification Search
CPC ................ A47J 37/0641; A47J 37/0629; A47J 37/0623; A47J 37/12; A47J 37/1204; A47J 37/1209; A47J 37/128
USPC ............ 220/374, 373, 367.1, 212; 126/21 A; 126/21 R; 99/403
See application file for complete search history.

(56) References Cited

U.S. PATENT DOCUMENTS 5,402,905 A * 4/1995 Couch ................ B65D 51/1611
220/374

FOREIGN PATENT DOCUMENTS

ES 2212924 A1 * 8/2004 .............. A47J 36/38

* cited by examiner

*Primary Examiner* — Robert J Hicks
(74) *Attorney, Agent, or Firm* — Kirton McConkie; Evan R. Witt

(57) ABSTRACT

An air inlet device of an air fryer, which has a heating chamber, includes an upper housing, and an upper cover disposed above and covering the upper housing. The upper cover and the upper housing cooperatively define a flow guide channel therebetween. The flow guide channel has an air inlet opening for entry of air into the air inlet device, and a chamber entry opening located inwardly of the air inlet opening for flowing of the air into the heating chamber. The flow guide channel has a curved shape from the air inlet opening to the chamber entry opening.

6 Claims, 6 Drawing Sheets

AIR INLET DEVICE OF AIR FRYER

CROSS-REFERENCE TO RELATED APPLICATION

This application claims priority from Chinese Patent Application No. 201910827877.0, filed on Sep. 3, 2019.

FIELD

The disclosure relates to an air fryer, more particularly to an air inlet device of an air fryer that uses heat flow for heating and cooking food.

BACKGROUND

An air fryer is a common small household appliance available on the market nowadays. An existing air fryer mainly includes a base device, an air inlet device disposed above the base device and suitable for entry of air, a heating chamber disposed between the base device and the air inlet device and suitable for containing food to be cooked, and a hot air device disposed within the heating chamber and suitable for heating the food to be cooked. In use, air entering the air inlet device is guided by the hot air device into the heating chamber for rapid heating, and forms a vortex heat flow with rapid circulation for cooking the food and drying the surface moisture, so that the cooked food achieve the appearance and taste of frying. From the above, it is apparent that the structural design of the air inlet device, which guides entry of the air, will affect the smooth flow of thermal convection and will change the cooking effect. Therefore, this disclosure is aimed at improving the air inlet device.

Referring to FIG. 1, an air inlet device 1 of an existing air fryer includes an upper housing 11, and an upper cover 12 disposed on and covering a top portion of the upper housing 11. The top portion of the upper housing 11 has a concave shape to receive the upper cover 12. The upper housing 11 has a peripheral wall 111 surrounding a periphery of the upper cover 12, a first inclined wall 112 extending downwardly, inwardly and inclinedly from the peripheral wall 111, a second inclined wall 113 extending inwardly and inclinedly from an inner periphery of the first inclined wall 112, and a rounded corner wall 114 connected between the first and second inclined walls 112, 113. The upper cover 12 and the upper housing 11 cooperatively define a flow guide channel 13. The flow guide channel 13 has an air inlet opening 131 surrounding the periphery of the upper cover 12 for entry of air, and a chamber entry opening 132 located inwardly of the air inlet opening 131.

Although the aforesaid air inlet device is suitable for flowing of air from outside to inside, since the shape of the upper cover 12 is completely different from that of the upper housing 11, the shape of the flow guide channel 13 is thus irregular. Further, the first inclined wall 112 is located obliquely below the air inlet opening 131 which corresponds to a space that blocks the air and which obviously hinders the entry of air, so that it is unable to effectively guide the air into the air fryer. As a result, most of the air passing through the air inlet opening 131 will directly hit the first inclined wall 112, and produce a turbulent vortex, even to the point of producing an abnormal sound, thereby disturbing the flow of the air in the flow guide channel 13. Thus, it causes an unsmooth and uneven entry of air, which in turn affects the heat convection and degrades the cooking effect. The design of the existing air inlet device 1 still needs to be improved.

SUMMARY

Therefore, an object of the present disclosure is to provide an air inlet device of an air fryer that is capable of alleviating at least one of the drawbacks of the prior art.

According to this disclosure, an air inlet device of an air fryer comprises an upper housing, and an upper cover disposed above and covering the upper housing. The air fryer has a heating chamber. The upper cover and the upper housing cooperatively define a flow guide channel therebetween. The flow guide channel has an air inlet opening for entry of air into the air inlet device, and a chamber entry opening located inwardly of the air inlet opening for flowing of the air into the heating chamber. The flow guide channel has a curved shape from the air inlet opening to the chamber entry opening.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Figure 1:
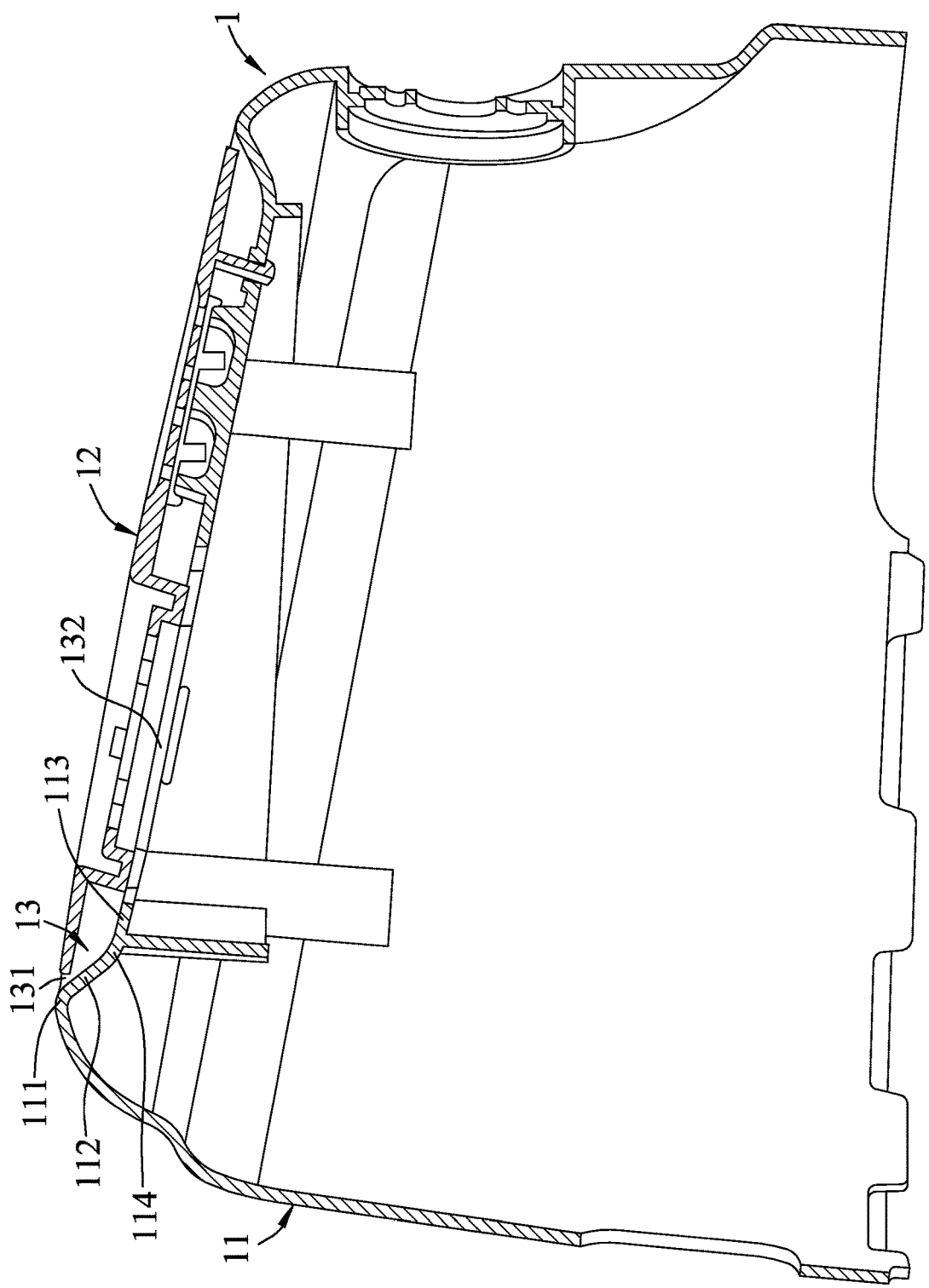
FIG. 1 is a sectional side view of an air inlet device of an existing air fryer.
Figure 2:
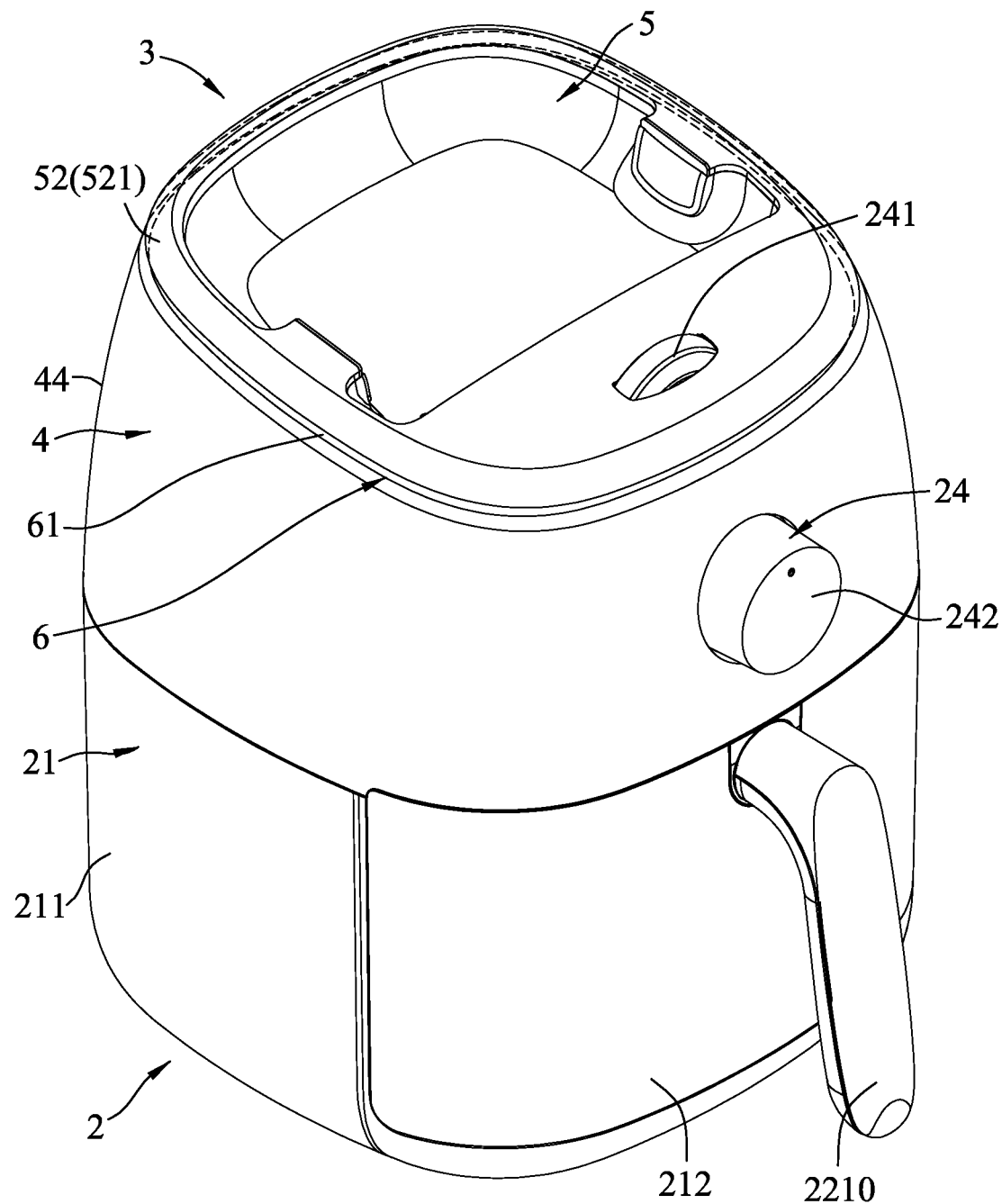
FIG. 2 is a perspective view of an air fryer incorporating an air inlet device according to an embodiment of the present disclosure.
Figure 3:
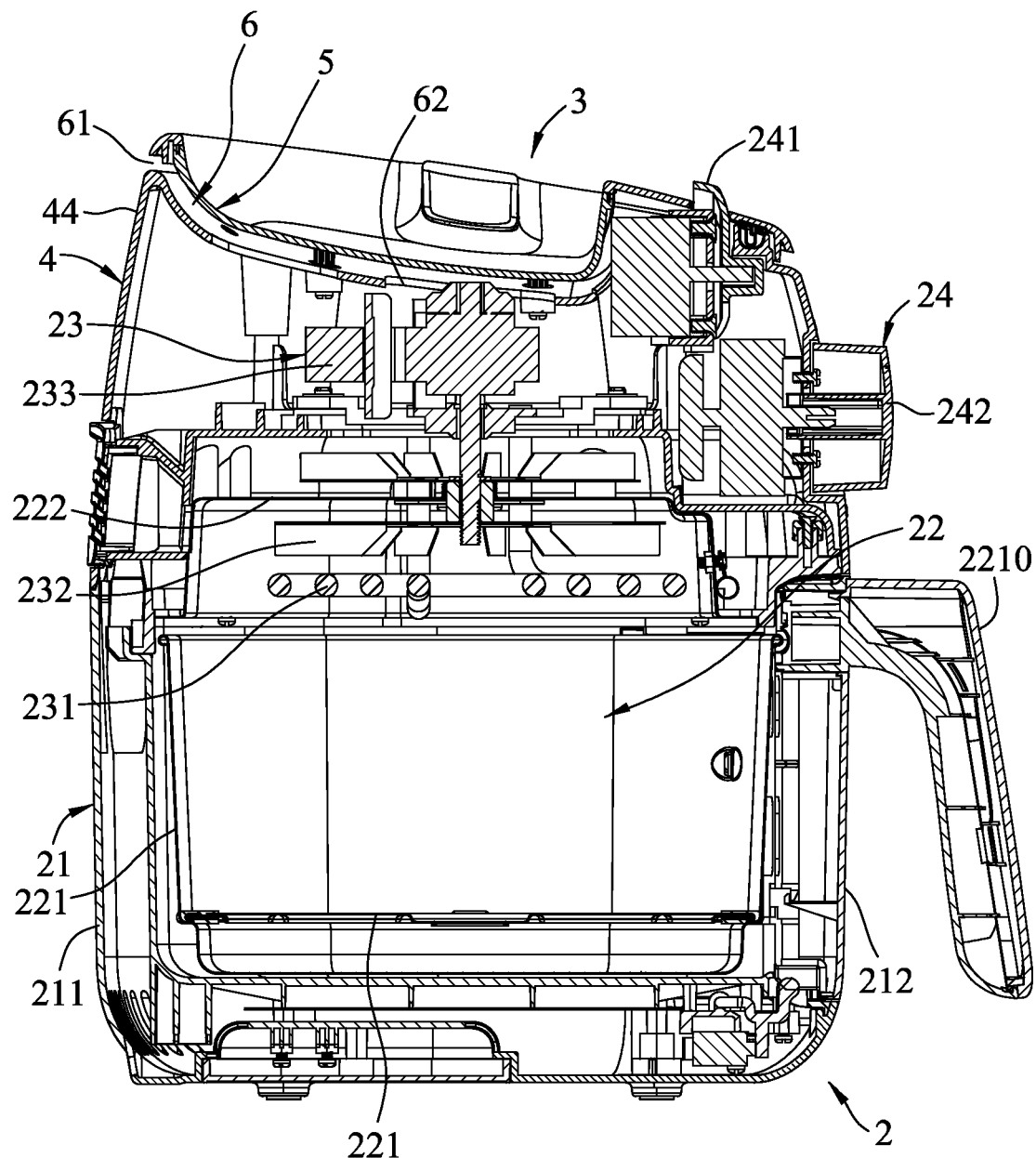
FIG. 3 is a sectional side view of the air fryer shown in FIG. 2.

FIGS. 2 and 3 illustrate an air fryer 2 incorporating an air inlet device 3 according to an embodiment of the present disclosure. The air fryer 2 includes a base device 21, a hot air device 23 and a control device 24. The base device 21 includes a lower housing 211 disposed below the air inlet device 3, a drawer 212 disposed in the lower housing 211 and located at a front side thereof, a cooking pot 221 that is removably disposed in the drawer 212, that is suitable for containing food to be cooked and that has a handle 2210 located externally of the drawer 212, and a covering 222 fixed on a bottom side of the air inlet device 3 and cooperating with the cooking pot 221 to define a heating chamber 22.

The hot air device 23 is disposed within the air inlet device 3, and is suitable for heating the food to be cooked. The hot air device 23 includes a heating element 231 disposed within the heating chamber 22, a fan 232 guiding air entering the air inlet device 3 to pass through the heating element 231 and flow into the heating chamber 22, and a motor 233 for driving the fan 232. The control device 24 is disposed on the air inlet device 3, and is electrically connected to the hot air device 23 for controlling the same. The control device 24 includes a temperature setting member 241 and a time setting member 242. The temperature and time can be set according to the type and quantity of the food to be cooked. Because the characteristic feature of the present disclosure resides in the structure of the air inlet device 3, the design of the air fryer 2 is not limited to what is disclosed in this embodiment.

The air inlet device 3 of this disclosure is suitable for providing entry of air into the air fryer 2, and is configured as a hollow body. The air inlet device 3 includes an upper housing 4, and an upper cover 5 disposed above and covering the upper housing 4. The upper cover 5 and the upper housing 4 cooperatively define a flow guide channel 6 therebetween.

Figure 4:
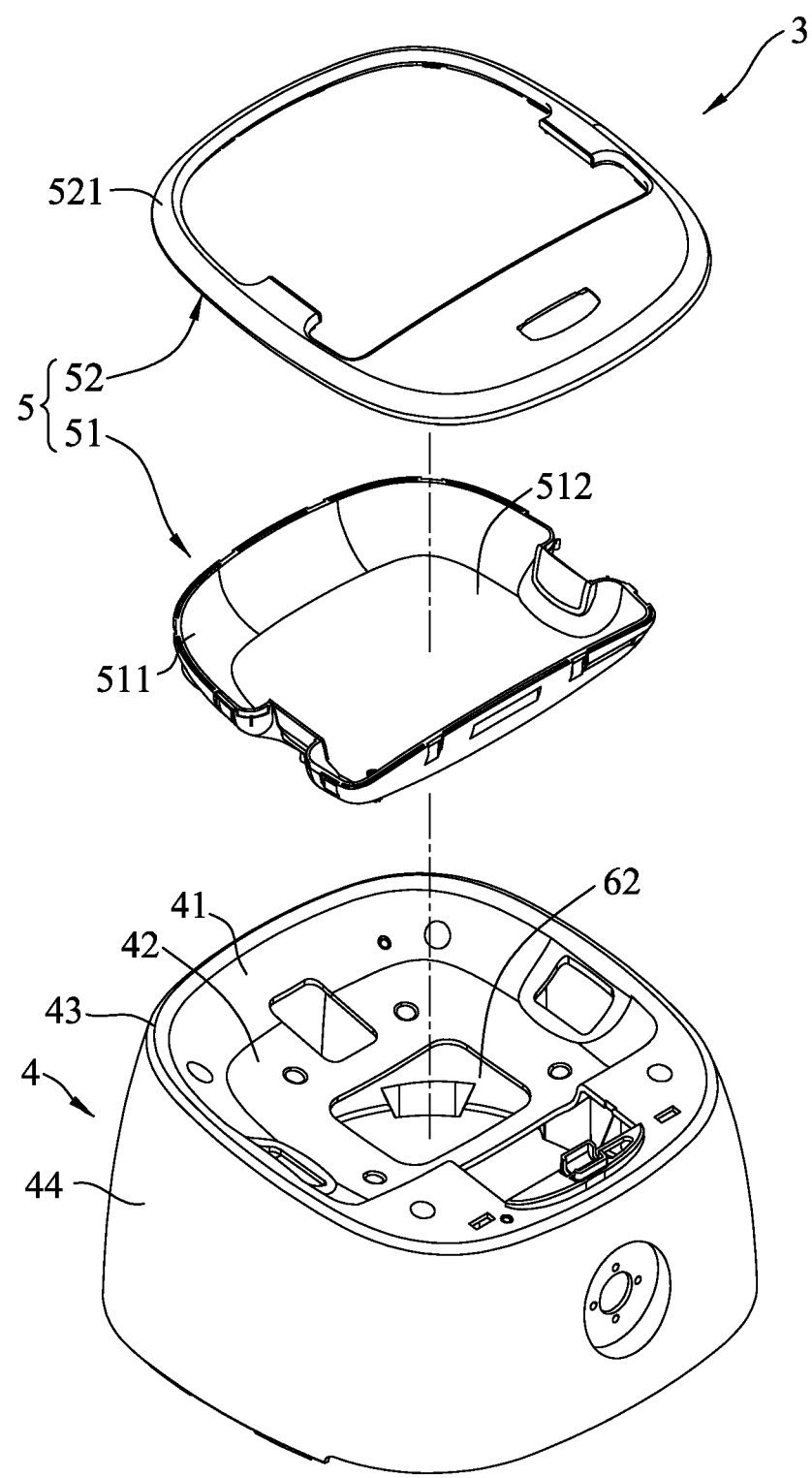
FIG. 4 is an exploded perspective view of the embodiment.
Figure 5:
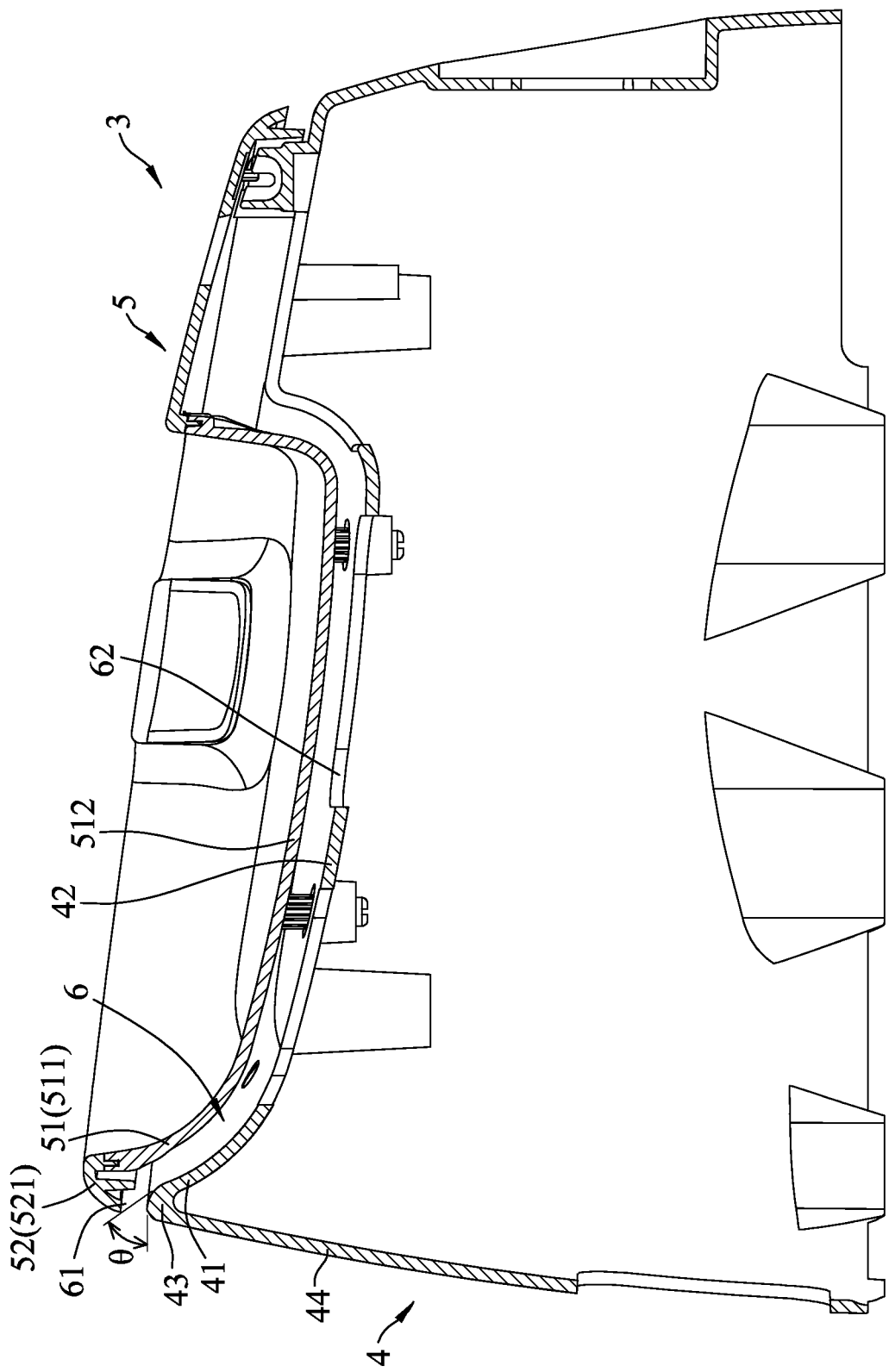
FIG. 5 is an enlarged sectional side view of the embodiment.
Figure 6:
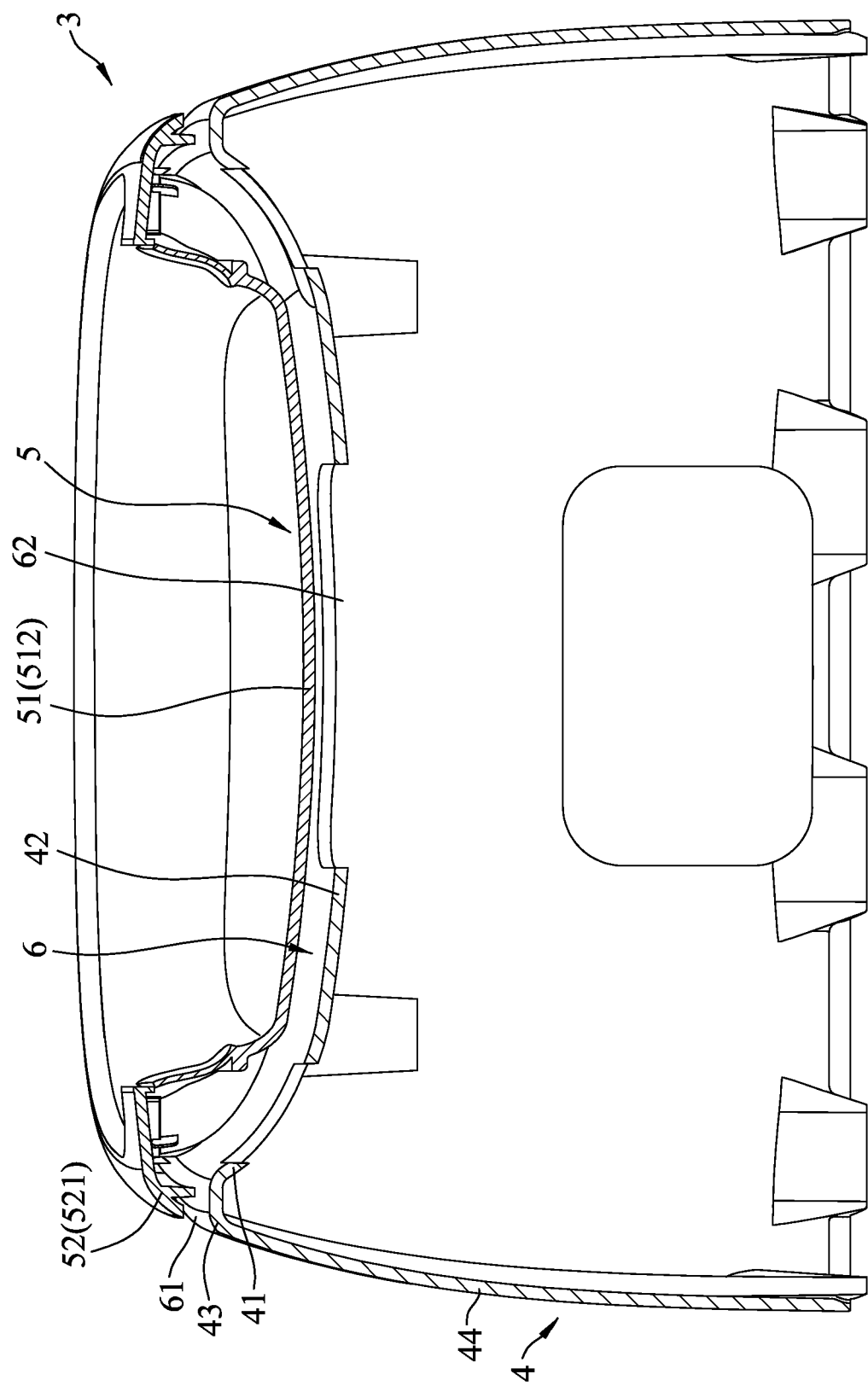
FIG. 6 is a sectional rear view of the embodiment.

With reference to FIGS. 4 to 6, the upper housing 4 includes a surrounding wall 44, a first housing curved wall 41 extending inwardly and curvedly from a top peripheral end 43 of the surrounding wall 44, and a second housing curved wall 42 connected to and extending inwardly and curvedly from an inner periphery of the first housing curved wall 41. The first housing curved wall 41 has a radius of curvature larger than 25 mm, while the second housing curved wall 42 has a radius of curvature larger than or equal to that of the first housing curved wall 41.

The upper cover 5 includes a lower cover portion 51, and an upper cover portion 52 having a ring-shaped peripheral wall 521 connected to a top peripheral end of the lower cover portion 51. The lower cover portion 51 includes a first cover curved wall 511 extending inwardly and curvedly from the top peripheral end thereof, and a second cover curved wall 512 connected to and extending inwardly and curvedly from an inner periphery of the first cover curved wall 511. The shape of the first cover curved wall 511 matches that of the first housing curved wall 41, and the shape of the second cover curved wall 512 matches that of the second housing curved wall 42. Each of the first housing curved wall 41 and the first cover curved wall 511 has a concave cross section. Each of the second housing curved wall 42 and the second cover curved wall 512 also has a concave cross section.

The first and second housing curved walls 41, 42 and the first and second cover curved walls 511, 512 cooperatively define the flow guide channel 6. The flow guide channel 6 has an air inlet opening 61 defined by the top peripheral end 43 of the surrounding wall 44 and the peripheral wall 521 of the upper cover portion 52 for entry of air into the air inlet device 3, and a chamber entry opening 62 located inwardly of the air inlet opening 61 and formed in the second housing curved wall 42 for flowing of the air entering the flow guide channel 6 via the air inlet opening 61 into the heating chamber 22. The flow guide channel 6 has a curved shape from the air inlet opening 61 to the chamber entry opening 62. An angle (θ) of the air inlet opening 61 relative to a horizontal plane is 10 to 80 degrees. That is, the flow guide channel 6 is designed to be laterally opened along a flow direction, and an entry direction of the air is substantially the same as the flow direction of the flow guide channel 6. The air sucked into the air inlet opening 61 will flow along the curved line of the flow guide channel 6 to the chamber entry opening 62.

To use the air fryer 2, the control device 24 is operated to activate the hot air device 23. The heating element 231 directly heats up and cooks the food. Simultaneously, the fan 232 is also activated to rotate so as to suck air into the flow guide channel 6 via the air inlet opening 61 and smoothly enter the heating chamber 22 via the chamber entry opening 62. Through the rapid heating of the heating element 231, a rapid circulating vortex heat flow is formed, so that the food can be evenly cooked and the surface moisture can be dried. Thus, the food is cooked with a fried aroma and crispy taste without adding oil.

In summary, with the design of the flow guide channel 6 being curved, the air inlet device 3 of this disclosure can optimize the flow path so that air can be sucked into the flow guide channel 6 via the air inlet opening 61 without obstruction, and can flow along the curved line of the flow guide channel 6 to the chamber entry opening into the heating chamber 22, thereby reducing frictional resistance between the air and the wall surface and thereby preventing the air from hitting the wall. Further, disturbance of the vortex can be effectively reduced to relatively increase the volume of the air and reduce the noise of the whole machine. Moreover, the heating efficiency of heat convection can be enhanced, making the cooked food more crispy and delicious. The effect of using the air fryer 2 incorporating the air inlet device 3 of this disclosure is good. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An air inlet device of an air fryer, the air fryer having a heating chamber, said air inlet device comprising:
    an upper housing and
    an upper cover disposed above and covering said upper housing;
    said upper cover and said upper housing cooperatively defining a flow guide channel therebetween;
    said flow guide channel having an air inlet opening for entry of air into said air inlet device, and a chamber entry opening located inwardly of said air inlet opening for flowing of the air into the heating chamber, said flow guide channel having a curved shape from said air inlet opening to said chamber entry opening.

2. The air inlet device of an air fryer as claimed in claim 1, wherein:
    said upper housing includes a surrounding wall, and a first housing curved wall extending inwardly and curvedly from a top peripheral end of said surrounding wall;
    said upper cover includes a lower cover portion, and an upper cover portion having a ring-shaped peripheral wall connected to a top peripheral end of said lower cover portion, said lower cover portion including a first cover curved wall extending inwardly and curvedly from said top peripheral end of said lower cover portion;
    each of said first housing curved wall and said first cover curved wall has a concave cross section.

3. The air inlet device of an air fryer as claimed in claim 2, wherein said said upper housing further includes a second housing curved wall connected to and extending inwardly and curvedly from an inner periphery of said first housing curved wall, said lower cover portion further including a second cover curved wall connected to and extending inwardly and curvedly from an inner periphery of said first cover curved wall, each of said second housing curved wall and said second cover curved wall having a concave cross section.

4. The air inlet device of an air fryer as claimed in claim 2, wherein said first housing curved wall and said second housing curved wall cooperate with said first cover curved wall and said second cover curved wall to define said flow guide channel, and said top peripheral end of said surrounding wall and said peripheral wall of said upper cover portion cooperatively define said air inlet opening.

5. The air inlet device of an air fryer as claimed in claim 1, wherein an angle of said air inlet opening relative to a horizontal plane is 10 to 80 degrees.

6. The air inlet device of an air fryer as claimed in claim 2, wherein said first housing curved wall has a radius of curvature larger than 25 mm.

* * * * *